United States Patent [19]

Shih

[11] Patent Number: 5,778,998

[45] Date of Patent: Jul. 14, 1998

[54] ELECTRICAL AUXILIARY DRIVE FOR A BICYCLE

[76] Inventor: Chin-yiao Shih, No. 1, Alley 1, Lane 164, Chinhua St., 18 Lin, Lung-an Li, Ta-an. Dist., Taipei, Taiwan

[21] Appl. No.: 781,212

[22] Filed: Jan. 10, 1997

[51] Int. Cl.$^6$ .................................................. B62D 61/02
[52] U.S. Cl. ........................................ 180/221; 180/342
[58] Field of Search ............................. 180/11, 65.1, 220, 180/221, 342, 205, 206, 298; 280/215

[56] References Cited

U.S. PATENT DOCUMENTS

| | | | |
|---|---|---|---|
| 2,578,886 | 12/1951 | Isherwood et al. | 180/342 |
| 3,878,910 | 4/1975 | Walker, Jr. | 180/342 |
| 4,386,675 | 6/1983 | Landon | 180/342 |

FOREIGN PATENT DOCUMENTS

| | | | |
|---|---|---|---|
| 2704512 | 11/1994 | France | 180/221 |
| 3623800 A1 | 4/1987 | Germany | 180/220 |
| 2073683 | 10/1981 | United Kingdom | 180/206 |
| 93/17904 | 9/1993 | WIPO | 180/220 |

Primary Examiner—Brian L. Johnson
Assistant Examiner—Gary Savitt
Attorney, Agent, or Firm—Rosenberg, Klein & Bilker

[57] ABSTRACT

An electrical auxiliary drive for a bicycle includes an inverted U-shaped bracket having a top wall disposed above a rear wheel of the bicycle and two side walls each fixedly mounted on a respective seat stay of the bicycle and each located adjacent to the rear wheel. Each of the two side walls of the bracket has an arcuate slot defined therein. Two motors are each mounted on a respective side wall of the bracket and each have a driving axle rotatably mounted thereon and slidably extending through an associated arcuate slot. A driven axle is mounted between the top wall of the bracket and the rear wheel and has two end portions each fixedly mounted on the driving axle of a respective motor. A driving wheel is fixedly mounted around the driven axle and detachably engages with the rear wheel.

6 Claims, 4 Drawing Sheets

5,778,998

1

ELECTRICAL AUXILIARY DRIVE FOR A BICYCLE

FIELD OF THE INVENTION

The present invention relates to an electrical drive, and more particularly to an electrical auxiliary drive for a bicycle.

BACKGROUND OF THE INVENTION

A conventional electrical auxiliary drive can output a determined amount of power supply to co-operate with physical pedaling of a rider so as to drive a bicycle synchronously, thereby providing a proper assistance for moving the bicycle. However, the conventional electric drive cannot precisely control power required for assisting the bicycle to move, thereby easily causing a waste of the power supply.

The present invention has arisen to mitigate and/or obviate the disadvantage of the conventional electrical auxiliary drive.

SUMMARY OF THE INVENTION

In accordance with one aspect of the present invention, there is provided an electrical auxiliary drive for a bicycle comprising an inverted U-shaped bracket including a top wall disposed above a rear wheel of the bicycle and two side walls each fixedly mounted on a respective seat stay of the bicycle and each located adjacent to the rear wheel. Each of the two side walls of the bracket has an arcuate slot defined therein.

Two motors are each mounted on a respective side wall of the bracket and each have a driving axle rotatably mounted thereon and slidably extending through an associated arcuate slot.

A driven axle is mounted between the top wall of the bracket and the rear wheel and has two end portions each fixedly mounted on the driving axle of a respective motor. A driving wheel is fixedly mounted around the driven axle and detachably engages with the rear wheel.

Further features of the present invention will become apparent from a careful reading of the detailed description provided hereinbelow, with appropriate reference to the accompanying drawings.

DETAILED DESCRIPTION OF THE PREFERRED EMBODIMENTS

Figure 1:
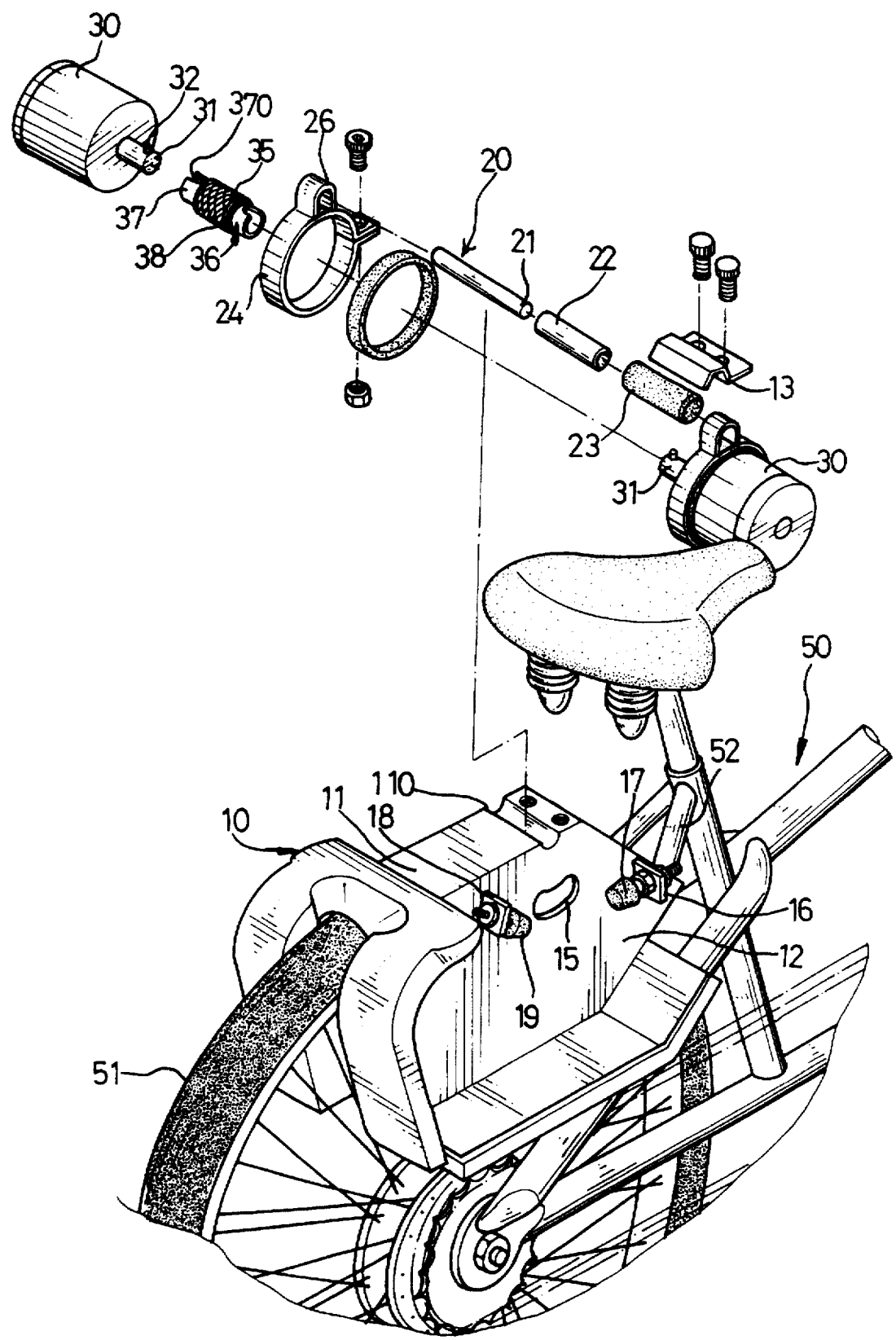
FIG. 1 is an exploded view of an electrical auxiliary drive in accordance with the present invention.
Figure 2:
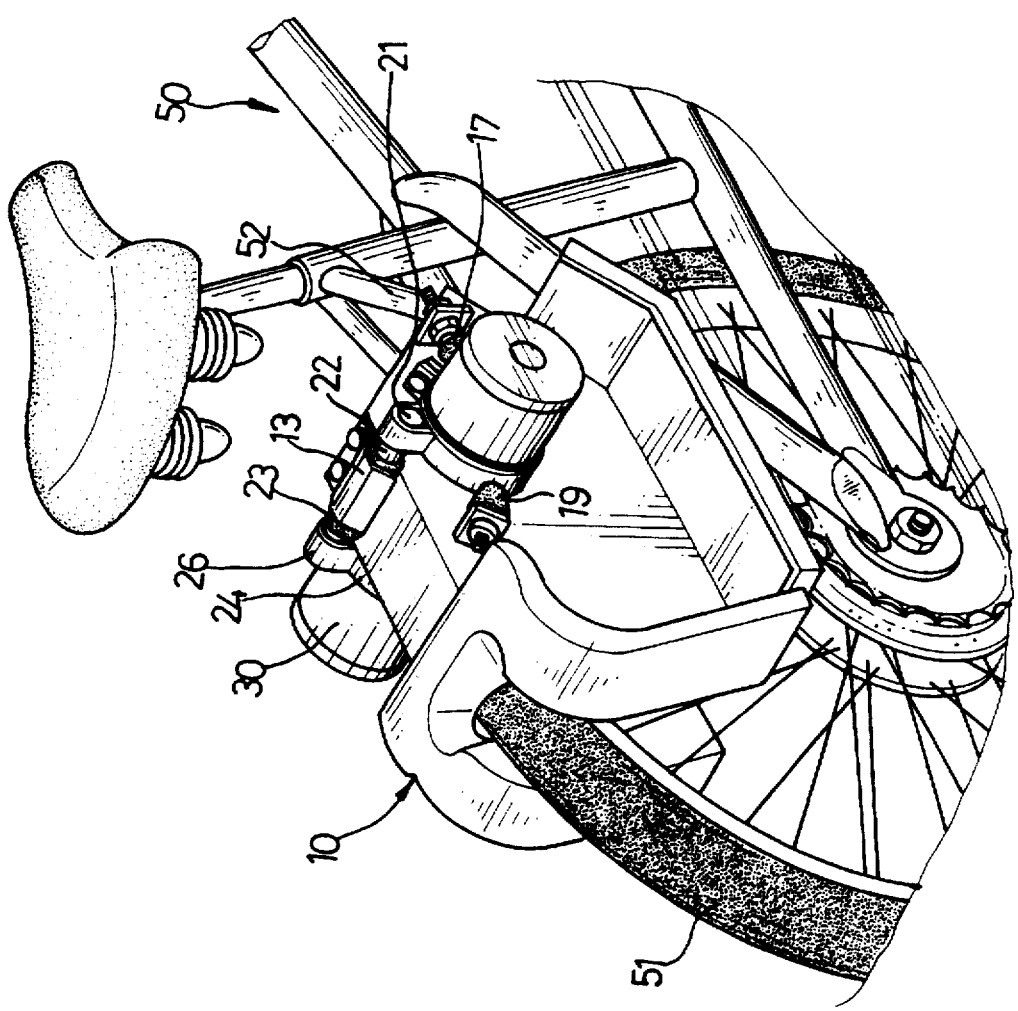
FIG. 2 is an assembly view of FIG. 1.
Figure 3:
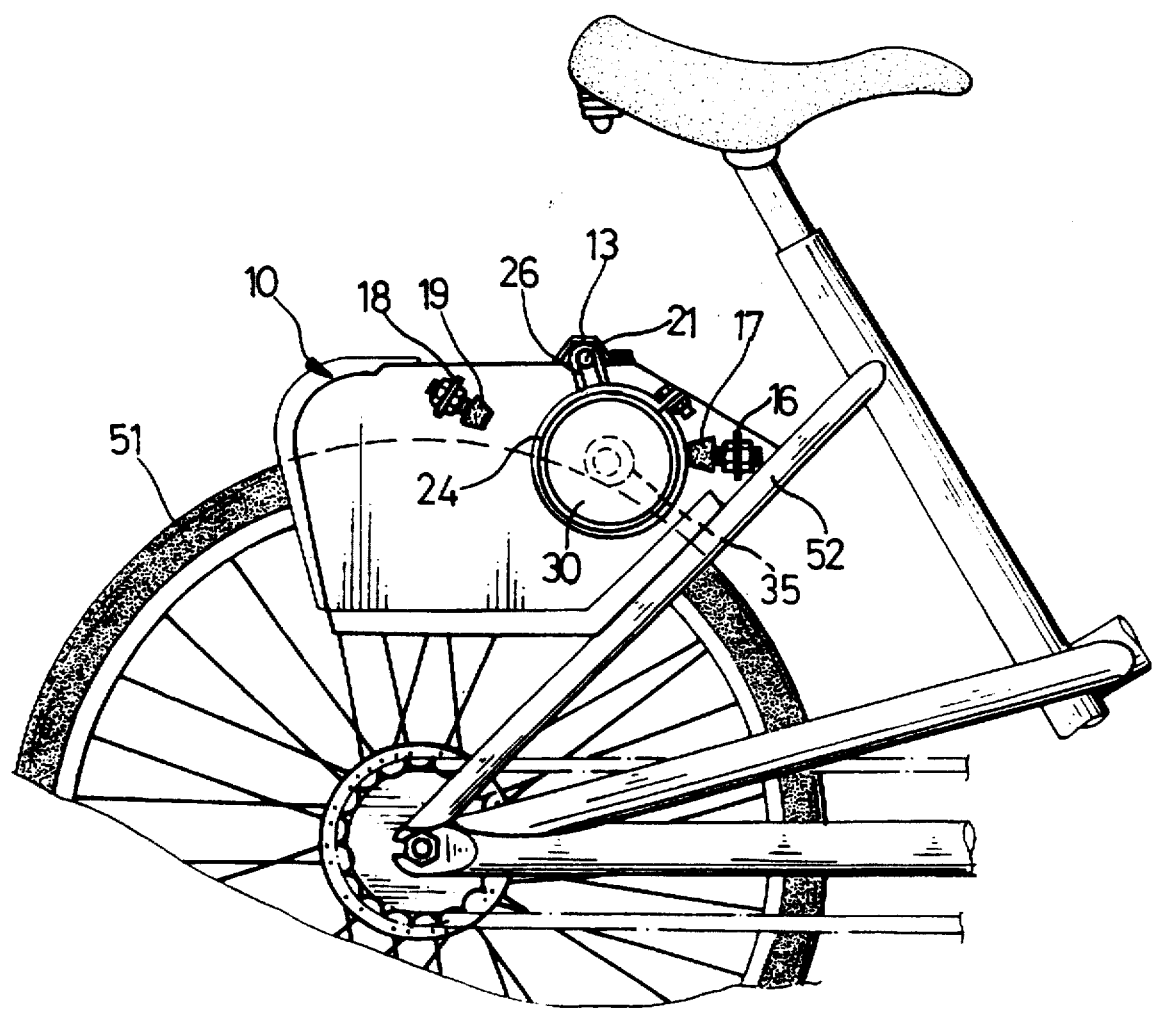
FIG. 3 is a front plan view of FIG. 2.

Referring to the drawings, and initially to FIGS. 1–3, an electrical auxiliary drive in accordance with the present invention is provided for assisting in moving a bicycle 50. The bicycle 50 includes a pair of seat stays 52, and a rear wheel 51 rotatably mounted between the pair of seat stays 52.

The electrical auxiliary drive comprises an inverted U-shaped bracket 10 including a top wall 11 disposed above the rear wheel 51 of the bicycle 50 and two side walls 12 each fixedly mounted on a corresponding one of the pair of

2 seat stays 52 of the bicycle 50 and each located adjacent to the rear wheel 51. Each of the two side walls 12 of the bracket 10 has an arcuate slot 15 defined therein.

Two motors 30 are each mounted on a respective side wall 12 of the bracket 10 and each have a driving axle 31 slidably extending through an associated arcuate slot 15.

A driven axle 36 is mounted between the top wall 11 of the bracket 10 and the rear wheel 51 and has two end portions 37 each fixedly mounted on the driving axle 31 of a respective motor 30 to rotate therewith.

Preferably, the driving axle 31 of each of the two motors 30 has a pin 32 protruding outwardly, and each of the two end portions 37 of the driven axle 36 has a recess 370 defined therein for receiving an associated pin 32 such that the driven axle 36 can be rotated by the driving axle 31 of each of the two motors 30.

A driving wheel 35 is fixedly mounted around the driven axle 36 and detachably engages with the rear wheel 51 for rotating the rear wheel 51. Preferably, a single direction bearing 38 is mounted between the driven axle 36 and the driving wheel 35.

Each of the two side walls 12 of the bracket 10 has a first end portion located adjacent to a respective seat stay 52 and a second end portion.

Two first lugs 16 are each fixedly mounted on the first end portion of a respective side wall 12 of the bracket 10 and each have a first stop 17 adjustably mounted thereon for limiting a movement of an associated motor 30.

Two second lugs 18 are each fixedly mounted on the second end portion of a respective side wall 12 of the bracket 10 and each have a second stop 19 for limiting a movement of an associated motor 30.

A tubular gasket 23 is securely mounted in a recess 110 which is defined in the top wall 11 of the bracket 10. A receiving tube 22 is fixedly mounted in the tubular gasket 23.

A positioning member (or pressing plate) 13 is fixedly mounted on the top wall 11 of the bracket 10 and is urged on the tubular gasket 23 for securely positioning the tubular gasket 23 together with the receiving tube 22 on the top wall 11 of the bracket 10.

A pivot axle 20 is pivotally mounted in the receiving tube 22 and has two distal ends 21 each extending outward of the receiving tube 22.

Two positioning rings 24 are each securely mounted around a respective motor 30 and each have an ear 26 protruding from a periphery thereof and fixedly mounted on a respective distal end 21 of the pivot axle 20 by means of such as brazing, such that each of the motors 30 can be pivoted relative to the pivot axle 20 and can be limited to move between the first stop 17 and the second stop 19.

Figure 4:
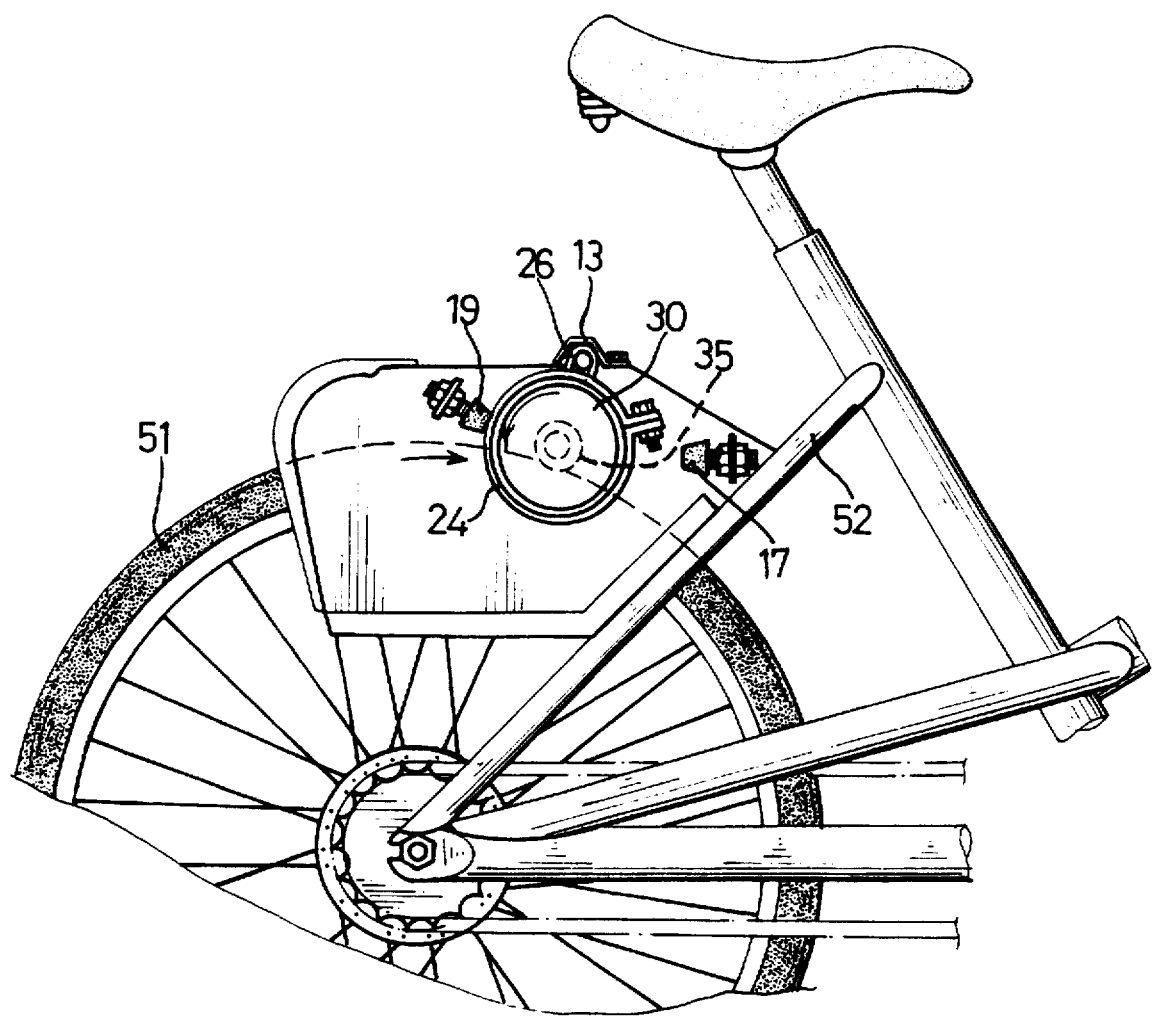
FIG. 4 is an operational view of FIG. 3.

In operation, referring to FIGS. 3 and 4 with reference to FIGS. 1 and 2, when the rear wheel 51 is rotated by a rider exerting a stepping force on a crank axle (not shown), the driving wheel 35 engages with the rear wheel 51 can be rotated by means of the driving axle 31 of each of the two motors 30 rotating the driven axle 36 so as to rotate the with the rear wheel 51 synchronously, thereby providing an auxiliary effect for rotating the rear wheel 51.

When a rotational velocity of the driving wheel 35 is much greater than that of the rear wheel 51, the rear wheel 51 will exert a counteracting force on the driving wheel 35 for retarding the rotation of the driving wheel 35 such that the driving wheel 35 together with each of the two motors 30 can be moved leftward from a position as shown in FIG. 3 to a position as shown in FIG. 4.

In the position as shown in FIG. 4, the driving wheel 35 engages with the rear wheel 51 to a tight extent, thereby being capable of providing an optimal auxiliary function for assisting the rear wheel 51 to rotate.

In addition, the second stop 19 can be used to limit a further movement of each of the two motors 30 such that the driving wheel 35 can be kept in contact with the rear wheel 51, thereby preventing the driving wheel 35 from disengaging with the rear wheel 51.

When the rotational velocity of the rear wheel 51 is much greater than that of the driving wheel 35, the driving wheel 35 together with each of the two motors 30 can be moved rightward from the position as shown in FIG. 4 to the position as shown in FIG. 3 due to a centrifugal action of the rear wheel 51 exerted on the driving wheel 35.

In the position as shown in FIG. 3, the driving wheel 35 loosely engages with the rear wheel 51 such that the driving wheel 35 simply keeps in contact with the rear wheel 51 and will not provide an auxiliary function for assisting the rear wheel 51 to rotate. In such a situation, each of the two motors 30 can be stopped rotating, thereby saving the power output.

In addition, the first stop 17 can be used to limit a further movement of each of the two motors 30, thereby preventing the driving wheel 35 from disengaging with the rear wheel 51.

It should be clear to those skilled in the art that further embodiments may be made without departing from the scope and spirit of the present invention.

What is claimed is:

1. The combination of an electrical auxiliary drive and a bicycle (50) which includes a pair of seat stays (52), and a rear wheel (51) rotatably mounted between said pair of seat stays (52), said electrical auxiliary drive comprising:

an inverted U-shaped bracket (10) including a top wall (11) disposed above said rear wheel (51) of said bicycle (50) and two side walls (12) each fixedly mounted on a corresponding one of said pair of seat stays (52) of said bicycle (50) and each located adjacent to said rear wheel (51), each of said two side walls (12) of said bracket (10) having an arcuate slot (15) defined therein;

two motors (30) each mounted on a respective side wall (12) of said bracket (10) and each having a driving axle (31) rotatably mounted thereon and slidably extending through an associated said arcuate slot (15);

a driven axle (36) mounted between said top wall (11) of said bracket (10) and said rear wheel (51) and having two end portions (37) each fixedly mounted on said driving axle (31) of a respective motor (30) to rotate therewith; and a driving wheel (35) fixedly mounted around said driven axle (36) and detachably engaging with said rear wheel (51) for rotating said rear wheel (51).

2. The combination in accordance with claim 1, further comprising a single direction bearing (38) mounted between said driven axle (36) and said driving wheel (35).

3. The combination in accordance with claim 1, further comprising a receiving tube (22) fixedly mounted on said top wall (11) of said bracket (10), a pivot axle (20) pivotally mounted in said receiving tube (22) and having two distal ends (21) each extending outward of said receiving tube (22), and two positioning rings (24) each securely mounted around a respective said motor (30) and each having an ear (26) protruding from a periphery thereof and fixedly mounted on a respective distal end (21) of said pivot axle (20).

4. The combination in accordance with claim 3, wherein said top wall (11) of said bracket (10) has a recess (110) defined therein for receiving said receiving tube (22).

5. The combination in accordance with claim 3, further comprising a positioning member (13) fixedly mounted on said top wall (11) of said bracket (10) and urged on said receiving tube (22) for positioning said receiving tube (22) on said top wall (11) of said bracket (10).

6. The combination in accordance with claim 1, wherein each of said two side walls (12) of said bracket (10) has a first end portion located adjacent to said seat stay (52) and a second end portion, two first stops (17) each fixedly mounted on the first end portion of a respective side wall (12) of said bracket (10) for limiting a movement of an associated said motor (30), and two second stops (19) each fixedly mounted on the second end portion of a respective side wall (12) of said bracket (10) for limiting a movement of an associated said motor (30).

* * * * *